SINGLE DELAY LINE DEMODULATOR SYSTEM FOR ANGLE MODULATED SIGNAL

Filed June 19, 1968 3 Sheets-Sheet 1

INVENTOR.
ALAN G. GRACE
BY
FOWLER, KNOBBE & MARTENS
ATTORNEYS.

INVENTOR.
ALAN G. GRACE
BY
FOWLER, KNOBBE
& MARTENS
ATTORNEYS.

INVENTOR.
ALAN G. GRACE

BY
FOWLER, KNOBBE
& MARTENS
ATTORNEYS.

United States Patent Office 3,525,946

Patented Aug. 25, 1970

3,525,946

SINGLE DELAY LINE DEMODULATOR SYSTEM FOR ANGLE MODULATED SIGNAL

Alan G. Grace, San Carlos, Calif., assignor to Westel Company, San Mateo, Calif., a copartnership composed of Westel Incorporated, Westel Associates, and Westel California Investors, all of San Mateo, Calif., all corporations of California Filed June 19, 1968, Ser. No. 738,307
Int. Cl. H03d 3/02
U.S. Cl. 329—110 10 Claims

ABSTRACT OF THE DISCLOSURE

A limiter limits an angle modulated input to produce a first square wave output in phase with the input and a second square wave output 180° out of phase. These square waves are amplified by a differential amplifier and applied across the primary winding of a transformer. The secondary winding of the transformer is coupled to a shorted delay line. A predetermined period of time after a pulse is applied to the primary winding of the transformer, a reflected pulse from the delay line will appear in the primary winding to cancel the input pulse. A detector means is coupled across the primary winding and will produce a pulse train having pulses which are initiated each time the primary winding of the transformer is pulsed and terminated when the reflected wave from the delay line is sensed in the primary winding. The pulse train produced by the detection means then has a frequency twice the instantaneous frequency of the modulated input to the system and has a duty cycle twice the delay time provided by the delay line. A low pass filter is connected to the output of the detecting means to reproduce the signal which modulated the input.

BACKGROUND OF THE INVENTION

Field of the invention

The present invention relates to an improved demodulator for angle modulated signals, and, in particular, to a demodulator having excellent linearity over the wide dynamic range of a magnetically recorded video signal.

DESCRIPTION OF THE PRIOR ART

A video signal which is reproduced from a magnetic tape on a video tape recorder presents a difficult demodulation problem due in part to the inherent amplitude modulation present in the reproduced video signal.

To obviate the noise that would otherwise be introduced into a demodulated signal by the amplitude modulation present in the reproduced video signal, state-of-the-art demodulators used in video tape recorders include a symmetrical limiter means which alternately clip the video signal when it exceeds a predetermined threshold and differentially amplifies it in several successive stages to produce a pair of square waves 180° out of phase which have leading and trailing edges coincident to the "zero crossovers" of the input signal. These square waves are then processed by a pulse generating means which generates a train of pulses wherein each pulse in the train ideally has a uniform amplitude and duration and corresponds to a zero crossing of the video signal. These pulses are then applied to a low pass filter which averages them and generates a demodulated signal output having an amplitude determined by the number of pulses in a given period of time and a frequency determined by the rate of change of the video signal about the carrier frequency.

This technique, while simple in theory, presents extremely difficult problems in application, particularly in the design of a satisfactory pulse generating means. A typical pulse generating means of the prior art includes two shorted delay lines each having one of the square waves as an input. The delay lines produce a reflected pulse having a polarity opposite to the polarity of the applied signal which will null out the signal after a predetermined period of time. Accordingly, when a square wave is applied to the delay line input, a positive pulse having a duration equal to two times the delay provided by the delay line will occur on the leading edge of each pulse and a negative pulse of the same duration will appear on each trailing edge. Since the two square waves applied to the delay lines are 180° out of phase, the positive pulses which occur on the inputs to the first delay line are 180° out of phase with the positive pulses occurring on the second delay line. These signals on the input to the delay lines are then full wave rectified so that only the positive pulses on each delay line appear as an output in the pulse generating means. The output pulses, therefore, are in phase with the zero crossovers of the video signal.

The difficulty encountered in a pulse generating means of this type is in matching the two delay lines exactly. Both delay lines must provide exactly the same delay and the same characteristic impedance. Otherwise, successive output pulses from a pulse generating means will have different pulse widths and amplitudes which will introduce distortion into the demodulated output of the low pass filter. As a practical matter, two such identical delay lines cannot be provided.

SUMMARY OF THE INVENTION

In accordance with the preferred embodiment of the present invention, a limiter means limits the video input signal to provide first and second squarewayes 180° out of phase with each other with each squarewave having a frequency corresponding to the instantaneous frequency of the video signal. A pulse generator means, which includes a transformer having a single shorted delay line connected to its secondary winding and the first and second squarewaves coupled to opposite sides of its primary winding, generates a train of pulses wherein each pulse has an extremely close phase relationship to a zero cross-over point in the video signal. A significant feature of the present invention is that each of these pulses are identical, each having a fixed amplitude and duration. Accordingly, when this pulse train is averaged by a low pass filter, an accurate reproduction of the modulation on the video signal is produced. The demodulated output from the low pass filter is free from the distortion which is present in the state of the art delay line demodulators.

BRIEF DESCRIPTION OF THE DRAWINGS

FIGS. 6*a* through 6*g* illustrate voltage waveforms at various points within the schematic of FIG. 3.

DESCRIPTION OF THE PREFERRED EMBODIMENT

Figures 2A, 2B, 2C, 2D, 2E, 2F:
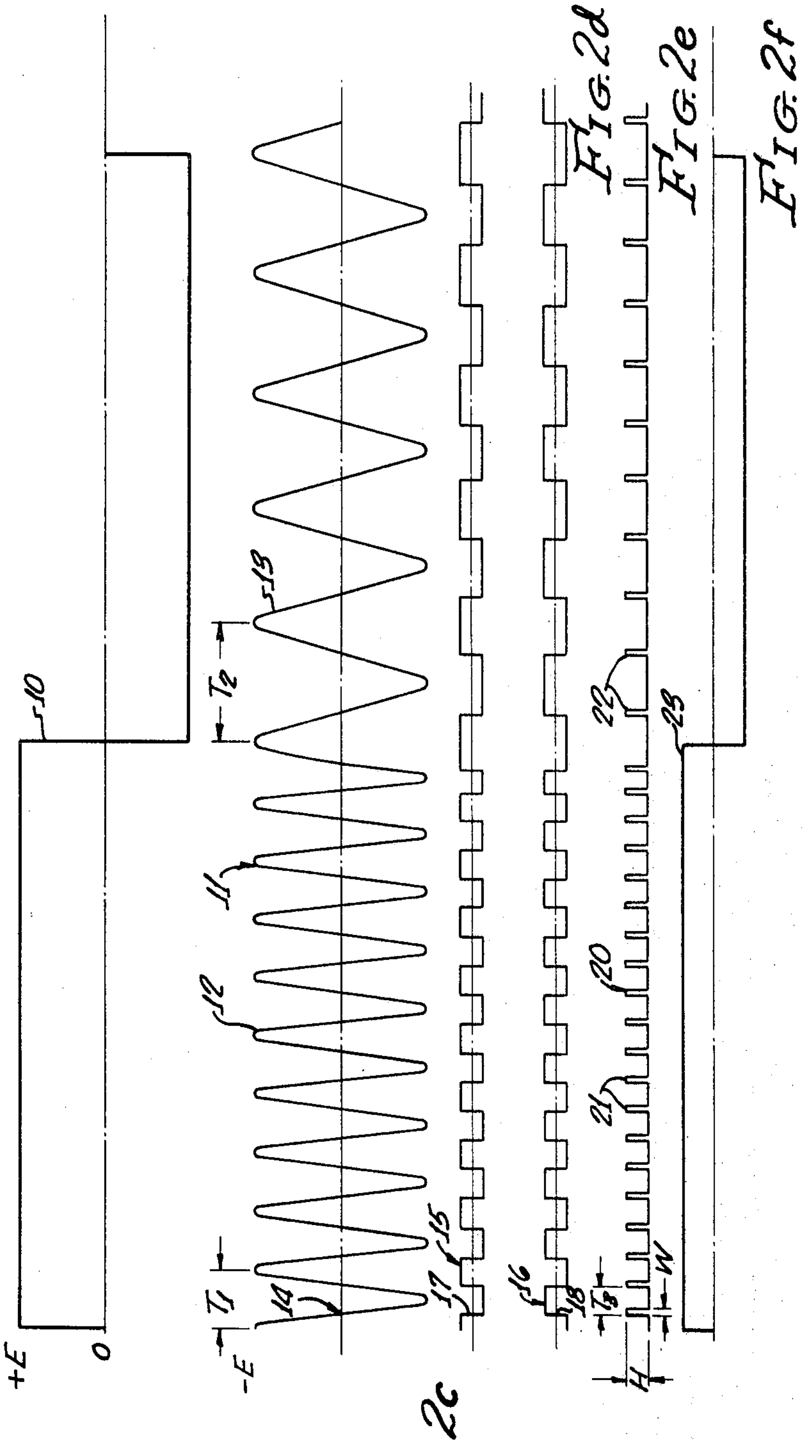
FIGS. 2*a* through 2*f* illustrate the general demodulation technique involved in the present invention.

The general demodulation technique implemented by the present invention is illustrated in FIGS. 2*a* through 2*f*. For ease of illustration, a very simple modulating signal in the form of a squarewave is shown in FIG. 2*a* at 10. The resultant frequency modulated signal is shown in FIG. 2*b* at 11 having a first sinewave 12 of period T1 corresponding to the fixed amplitude at level "E" of the modulating signal 10 and a second sinewave 13 of longer period T2 corresponding to the fixed amplitude —E of the modulating signal 10.

In the preferred embodiment of the present invention, the modulated signal 11 is limited by a symmetrical limiter means, described hereinafter, which provides a first squarewave, shown in FIG. 2*c* at 15, which is in phase with signal 11 and a second squarewave 180° out of phase, shown in FIG. 2*d* at 16. The squarewaves 15 and 16 have a frequency corresponding to the instantaneous frequency of the modulated signal 11. Therefore, for each negative going "zero crossing" of the signal 11 such as point 14, a negative going edge such as edge 17 in the squarewave 15 occurs and a positive going edge such as edge 18 in squarewave 16 occurs.

The squarewaves 15 and 16 are processed by a pulse generating means to produce a pulse having a predetermined duration and amplitude each time the modulated signal 11 has a "zero crossing" transition. Such a pulse train is shown in FIG. 2*e* at 20 wherein each of the pulses 21 correspond to a "zero crossing" of the sinewave 12, and each of the pulses 22 correspond to "zero crossing" of the sinewave 13. The pulses 21 and 22 all have a constant duration W and amplitude H. The frequency rate of the pulses 21 is twice the instantaneous frequency of the modulated waveform 12 and has a period T3 which is one-half of the period T1 of the signal 12. Likewise, the frequency rate of the pulses 22 is twice the frequency of sinewave 13.

The pulse train 20 is then averaged through a low pass filter, which generates a waveform such as waveform 23 seen in FIG. 2*f* which is a reproduction of the original modulation signal 10.

A high band color video signal may have a carrier frequency of 8.5 mc. which may be varied nominally between 7 mc. and 10 mc. at a rate of up to 4.25 mc. The maximum instantaneous frequency of a high band color signal may be as high as 13.5 mc. If the modulated signal 12 in FIG. 2*b* has an instantaneous frequency of 13.5 mc., for example, the period T1 of signal 11 would be approximately 74 nsec. and the frequency of the pulses 21 seen in FIG. 2*e* would be 27 mc. with the period T3 being 37 nsec. Accordingly, for modulated signals of this frequency, the width W of the pulses in pulse train 20 must be less than 37 nsec. and preferably between 20 and 30 nsec. It will be seen that any variation in the area of the pulses in pulse train 20 caused, for example, by a variation in the width of the pulses 21 or 22 or a variation in the pulse amplitude will result in an error in the demodulated output signal 23.

A significant feature of demodulation systems constructed in accordance with the present invention is that width W and the height H of the pulses in pulse train 20 is maintained constant throughout the frequency spectrum of the frequency modulated video signal. Further, each pulse in pulse train 20 is in accurate phase correspondence with the zero crossover points of the modulated signal 11. Therefore, the demodulated signal 23 is a very accurate reproduction of the modulating signal waveform 10.

Figure 1:
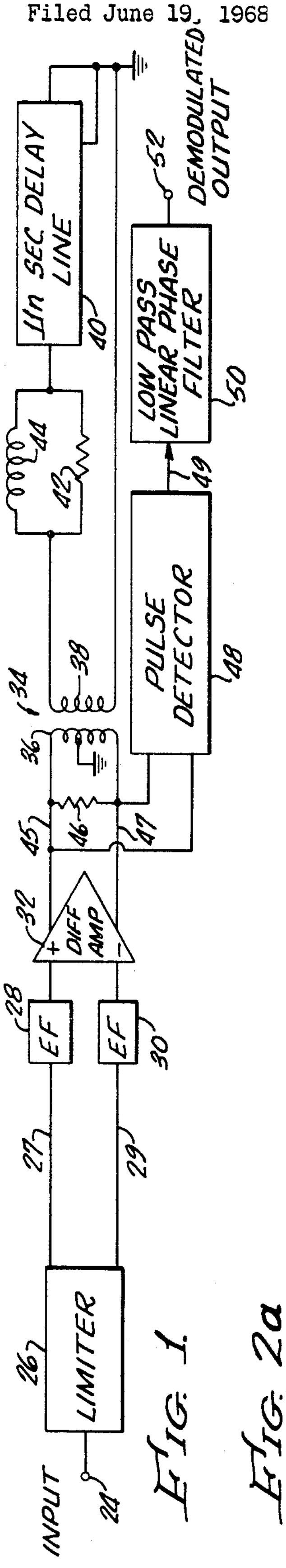
FIG. 1 is a block diagram of the preferred embodiment of the present invention.

Referring now to FIG. 1, there is shown a system block diagram of the preferred embodiment of the present invention. An angle modulated signal such as waveform 11 of FIG. 2*b* is applied to a terminal 24 as an input to a symmetrical limiting means 26. The limiting means 26 eliminates any amplitude modulation on the input signal by alternately clipping the input signal and differentially amplifying it in successive stages to generate a pair of squarewaves on output lines 27 and 29 which have the same instantaneous frequency as the input signal to limiter 26. The squarewave on line 27 is in phase with the input signal to limiter 26 and corresponds to the squarewave 15 while the squarewave on line 29 is 180° out of phase and corresponds to squarewave 16.

The signals on lines 27 and 29 are amplified by emitter followers 28 and 30 which provide a power gain stage for the signals and are applied as inputs to a differential amplifier 32. The differential amplifier 32 generates a first and a second pulse train output on lines 45 and 47, respectively. The pulse trains on lines 45 and 47 have the same frequency as the squarewaves appearing on lines 27 and 29, respectively.

A transformer 34 includes a primary winding 36 which has a center tap connected to ground and a secondary winding 38. The pulse train occurring on line 45 is connected to one side of the primary winding 36 and the pulse train on line 47 is applied to the opposite side. Each time a pulse occurs on line 45, or line 47, a corresponding pulse is induced into the secondary winding 38.

A delay line 40 having a shorted termination is series connected with a parallel connected inductor 44 and resistor 42 across the transformer secondary winding 38. The transformer 34 provides a means for coupling the pulses appearing on lines 45 and 47 as an input to the delay line 40. The delay line 40 is selected to provide a predetermined delay time. Accordingly, when a pulse is induced in the secondary winding 38, and applied to the delay line 40, a reflected pulse having the opposite polarity will be generated by the delay line 40 after a period of time equal to two times the delay of the delay line. This reflected pulse from delay line 40 will be applied to the secondary winding 38 and cause a pulse to be induced into primary winding 36 through the transformer 34 to null out or cancel the original pulse appearing on either line 45 or 47. The pulses appearing on lines 45 and 47 then will have a duration equal to two times the delay provided by delay line 40.

The inductor 44, although unnecessary for proper operation of the present invention, helps to maintain the shape of the pulses appearing in secondary winding 38 by eliminating the high frequency ringing in the pulses. Resistor 42 has a value selected to match the characteristic impedance of the delay line 40, a typical value being 50 ohms.

A resistor 46 is connected across the primary winding 36 to allow transformer 34 to operate efficiently as a coupling means between the amplifier 32 and the delay line 40. The resistor 46 has a value selected to match the impedance of the elements connected across the secondary winding 38 when reflected to the primary side of the transformer 34.

A pulse detecting means 48 is responsive to the signals appearing on lines 45 and 47 and will generate a train of pulses on line 49 wherein each pulse is initiated when a pulse occurs on line 45 or 47 and is terminated when the reflected pulse from delay line 40 appears in the primary winding 36. That is, the pulses on line 49 will have the same duration as the pulses on lines 45 and 47. The pulse train on line 49 corresponds to waveform 20 shown in FIG. 2*e*. Accordingly, the pulses on line 49 are initiated in phase with the zero crossover points of the video signal on terminal 24 and have a predetermined constant duration equal to two times the delay provided by the delay line 40.

The pulse train on line 49 is an input to a low pass linear phase filter 50. The filter 50 will average the pulses on line 49 and generate a signal on line 52 which is the demodulated output of the system. A typical response characteristic for the filter 50 is a flat bandpass out to 4 mc. dropping off 3 db at 4.25 mc. and dropping to greater than 45 db at all frequencies above 5.6 mc., such response insuring that the entire video band width is recovered in the output on terminal 52 while effectively removing the carrier frequency energy.

The delay provided by the delay line 40 is selected to be significantly less than one-fourth of the period of the maximum instantaneous frequency of the video signal applied to input terminal 24. By way of specific example, the maximum instantaneous frequency of a high band color signal may be approximately 13.5 mc. Such 13.5 mc. input signal produces a pulse train on line 49 having a frequency of 27 mc. and a period of 37 nsecs. The pulses on line 49 must therefore have a duration of less than 37 nsecs. Since the duration of these pulses is equal to two times the delay provided by the delay line 40, delay line 40 must have a delay time of less than 18.5 nsecs. In the preferred embodiment of the present invention, delay line 40 provides an 11 nsec. delay resulting in a 22 nsec. pulse width for the pulses on line 49.

Figure 3:
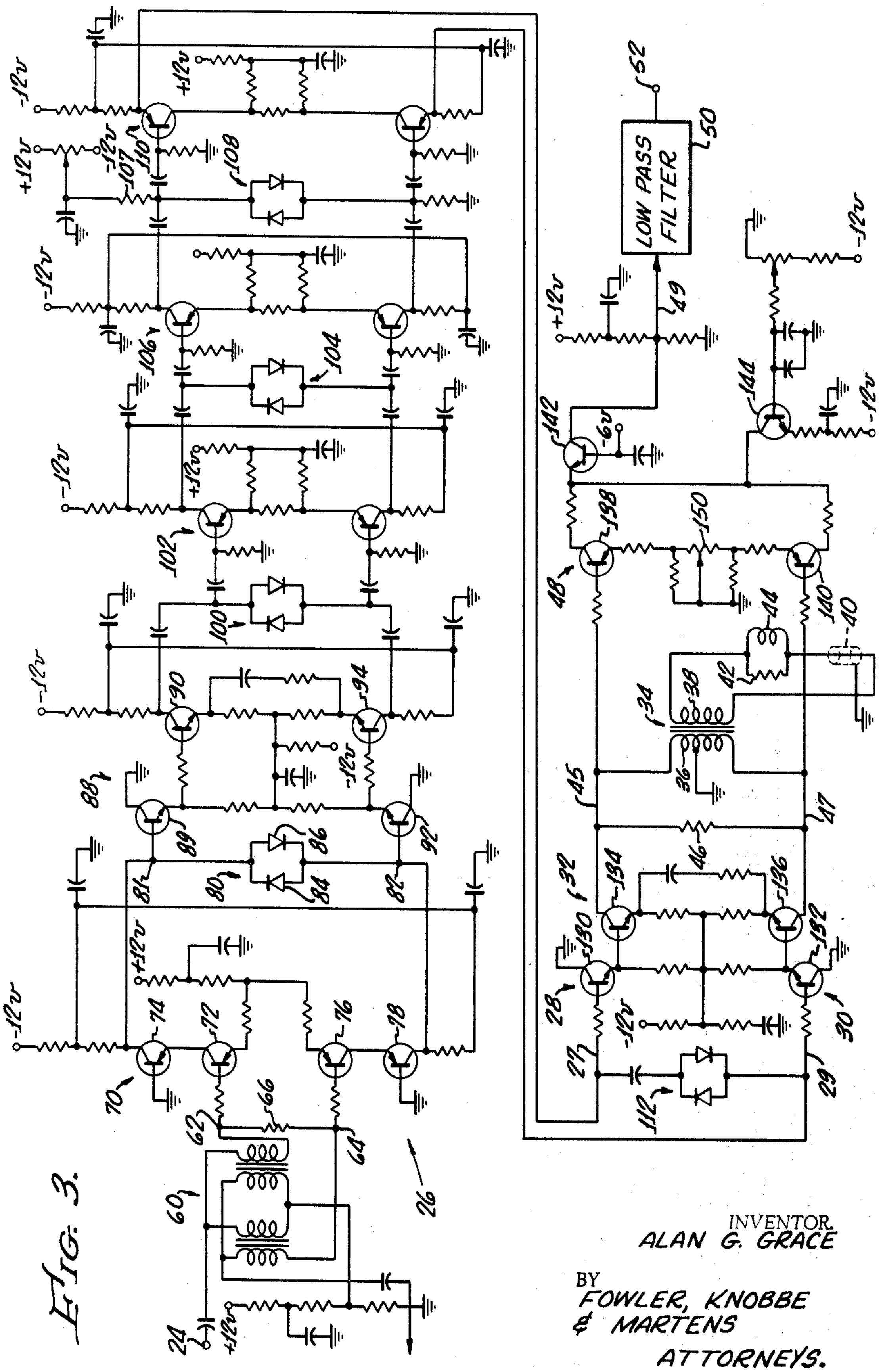
FIG. 3 is a schematic diagram of the preferred embodiment of the present invention.

Referring to FIG. 3, there is shown a schematic diagram of the system shown in block diagram form in FIG. 1. The modulated video signal is an input to the symmetrical limiting means 26 on terminal 24 and is connected to a balanced balum transformer 60. The transformer 60 performs the dual functions of matching the impedance of the limiter 26 to the output impedance of the source for the video signal applied to terminal 24 and generating first and second symmetrical video signals on node points 62 and 64, respectively. The signal at 62 is in phase with the video input signal while the signal at 64 is 180° out of phase.

The limiter 26 alternately amplifies and clamps the input signal in successive stages comprising amplifiers 70, 88, 102, 106 and 110 and clamping circuits 80, 100, 104, 108 and 112 to generate two squarewaves on lines 27 and 29.

The symmetrical signals at points 62 and 64 are amplified by a symmetrical amplifier 70 which includes an upper amplifier portion comprising transistors 72 and 74 for amplifying the signal appearing on point 62 and a lower amplifier portion comprising transistors 76 and 78 for amplifying the signal on point 64. The amplified output of the upper portion of amplifier 70 appears on the collector electrode of transistor 74 and the amplified output of the lower portion appears on the collector electrode of transistor 78.

The upper and lower portions of the amplifier stage 70 operate identically and may be described as cascade-coupled amplifiers which provide a gain in the order of 16.

In many types of transistorized amplifiers, the inherent collector to base "Miller" capacitance of the transistors is magnified by the amplification factor of the amplifier thus limiting its bandwidth. Since the amplifier sections of amplifier 70 are cascade-coupled amplifiers, this "millering effect" is obviated thus allowing a high bandwidth (e.g. 100 mc.). Functionally, transistor 72 is a current source which amplifies the signal appearing on its base and applies it to the emitter of transistor 74 which has its base electrode connected to ground. Transistor 74 therefore appears as a virtual ground to transistor 72 thus isolating the collector to base capacitance of transistor 72 from the amplified output on the collector of transistor 74.

The amplified output signals from amplifier stage 70 are applied across a clamping stage 80 at points 81 and 82. Clipping stage 80 comprises two parallel connected diodes 84 and 86 which are oppositely poled. When the amplified signal appearing at point 81 reaches a value of approximately .6 of a volt with respect to point 82, diode 86 will begin to conduct clamping the voltage at point 81 to that level. In a like manner, when the voltage at point 82 reaches approximately .6 of a volt with respect to point 81, diode 84 will clamp that voltage at that level. The clamping action of diodes 86 and 84 is shown in FIGS. 5*a* and 5*b* respectively. In FIG. 5*a*, a waveform 120 representing the output from transistor 74 is shown clamped by diode 86 removing a portion 121 from the waveform. In FIG. 5*b* a waveform 122 representing the amplified output from transistor 78 is clamped by diode 84 to remove a portion 123 of the waveform. It will be noted that waveform 122 is 180° out of phase with waveform 120, and accordingly, wave segment 123 lags wave segment 121 by 180°.

The wave segments seen in FIGS. 5*a* and 5*b* are then alternately amplified and clamped by successive stages in the limiting means 26 to generate two squarewaves on the output lines 27 and 29 which are 180° out of phase with each other and which have leading and trailing edges corresponding to the zero crossover points of the input signal applied to terminal 24. The squarewaves appearing on lines 27 and 29 have a peak-to-peak voltage of approximately 1.2 volts and have leading and trailing edges which exhibit a rise and fall time of approximately 2 nsec. These squarewaves are the squarewaves 15 and 16 shown in FIGS. 2*c* and 2*d*, respectively.

Although a preferred embodiment of the limiter 26 has been illustrated in FIG. 3 and described above, any symmetrical limiting means may be used as the limiter 26, providing that it generates complementary squarewave outputs and has good phase and frequency response over a wide frequency bandwidth with excellent linearity handling both the positive and negative excursions of an input signal in the same manner. The limiter 26 should also have sufficient gain to substantially reduce the amplitude variations in the input waveform a significant amount, 50 db, for example.

The signals on lines 27 and 29 are amplified by emitter follower amplifier stages 28 and 30, respectively, as seen in FIG. 3. Emitter follower amplifier 28 a transistor 130 which is biased to be in a Class A amplification condition at all times, that is, transistor 130 is always conducting. In a like manner, emitter follower 30 includes a transistor 132 also in a Class A amplification condition. Accordingly, when a positive portion of the squarewave appearing on line 27 occurs, transistor 130 will become more conductive to amplify that portion of the squarewave as an output. Transistor 132 functions in the same manner.

The outputs from emitter followers 28 and 30 are applied as an input to the differential amplifier 32 which includes transistors 134 and 136. The outputs from emitter followers 28 and 30 are connected to the base electrodes of transistors 134 and 136, respectively. The collector electrode of transistor 134 is connected to one side of the primary winding 36. The opposite side of primary winding 36 is connected to the collector electrode of transistor 136. When transistor 130 becomes more conductive due to a positive portion of the squarewave on line 27, transistor 134 becomes more conductive. Current flow through transistor 134 is from the grounded center tap of primary winding 36 through the transistor 134. Accordingly, when transistor 134 becomes more conductive, the collector potential of transistor 134 will become more negative. The positive portion of the squarewave on line 27 then results in a negative pulse being initiated on the line 45, that is, the collector of 134. In a like manner, a positive portion of the squarewave appearing on line 29 will result in the collector potential of transistor 136 becoming negative.

Each time a pulse occurs on line 45 or 47 corresponding to a pulse appearing on line 27 and 29, respectively, a pulse is induced through transformer 34 into the secondary winding 38. The pulse in winding 38 is applied to the delay line 40 which has a shorted termination. The pulse incident to delay line 40 will be reflected back to the secondary winding 38 after a period of time equal to twice the delay time of the delay line 40 and will have a polarity opposite to that of the incident pulse. The pulse reflected to winding 38 will induce a pulse into the primary winding 36 to null out the applied pulse. Accordingly, the negative pulse appearing on line 45 or 47 due to a positive pulse on line 27 or 29, respectively, will be nulled out after a period of time equal to two times the delay provided by delay line 40.

To insure that the reflected pulses appearing in the primary winding 36 will indeed null out the signals appearing on lines 45 and 47, transformer 34 is selected to introduce a minimum of amplitudes and phase distortion in the coupling between the differential amplifier 32 and the delay line 40. For example, transformer 34 will advantageously exhibit an amplitude match between the primary winding 36 and the secondary winding 38 of within .1 db and a phase match of no worse than 1° at frequencies down to 500 kc.

The operation of the differential amplifier 32 can be more readily seen by referring to FIGS. *6a* through *6g*. A waveform 124 in FIG. *6a* represents the signal appearing on line 27 and a dotted waveform 126 in FIG. *6b* represents the resulting signal on line 45 as it would appear if the delay line 40 were not coupled to the output of differential amplifier 32. Note that the waveform 126 is merely an inverted version of waveform 124. That is, as previously described, when a positive going edge such as edge 127 occurs in waveform 124 a negative going edge such as edge 128 occurs in waveform 126. When the delay line 40 is coupled to the output of differential amplifier 32 the waveform 126 is modified as shown resulting in a pulse having a width W, equal to two times the delay provided by the delay line 40, each time an edge in the waveform 126 occurs.

The waveforms in FIGS. *6d* and *6e* correspond to the signals appearing on lines 29 and 47 respectively.

The signals appearing on line 45 and 47 are an input to the pulse detector means 48 which includes transistors 138, 140, 142 and 144. Line 45 is connected to the base electrode of transistor 138 and line 47 is connected to the base electrode of transistor 140. A negative pulse greater than approximately —.6 v. occurring on line 45 or line 47 will turn on the associated transistor 138 or 140, respectively. Accordingly, when the positive portion of a squarewave occurs on line 27, resulting in a negative pulse being initiated on line 45, transistor 138 will become conductive. Transistor 138 will turn off when the reflected pulse into the primary winding 36 is received from the delay line 40 nulling out the pulse on line 45. Transistor 138 then will be on for a period of time equal to two times the delay provided by delay line 40. Transistor 140 operates in a manner complementary to transistor 138.

A constant current source comprising transistor 144 has its collector electrode coupled to the collector electrodes of transistors 138 and 140. The transistor 142 has its emitter electrode coupled in common with the collector electrode of transistor 144. Transistor 144 is biased so that a constant current flows through its collector to emitter circuit. Accordingly, the current into transistor 144 must be supplied through transistor 142 or, in the alternative, one of the transistors 138 or 140. If both transistors 138 and 140 are in the non-conductive condition, transistor 142 provides all of the current necessary through the transistor 144. When either transistor 138 or transistor 140 is conductive in response to a pulse appearing on line 45 or 47, the current flowing through transistor 142 is diminished. Accordingly, when transistor 138 or 140 is conductive, a pulse output from the collector of transistor 142 appears as an input to low pass filter 50.

In FIGS. *6c* and *6f* there are shown two waveforms representing the voltages appearing on the collector electrodes of transistors 138 and 140 respectively. When either tronsistor 138 or 140 becomes conductive due to a negative pulse on lines 45 or 47 (FIGS. *6b* and *6e*) the increased current flow through the emitter to collector circuit results in the pulses seen in FIG. *6c* and *6f* respectively. Each time transistor 138 or transistor 140 becomes conductive, the transistor 142 becomes less conductive, as described above, causing the potential of its collector electrode to become more positive. A waveform 130 in FIG. *6g* represents the signal appearing on the collector of transistor 142. Note that signal 130 is a summation of the waveforms in FIGS. *6c* and *6f*.

The amplitude of the pulses appearing in FIG. *6g* is maintained constant by a balancing adjustment in the detector means 48. Referring to FIG. 3, a balancing potentiometer 150 is coupled in series with the emitter electrodes of the transistors 138 and 140. The potentiometer 150 is adjusted so that when transistors 138 and 140 are conductive they provide an identical amount of current into the constant current transistor 144. Accordingly, each pulse on line 49 will have the same amplitude.

Figures 4, 5, 6:
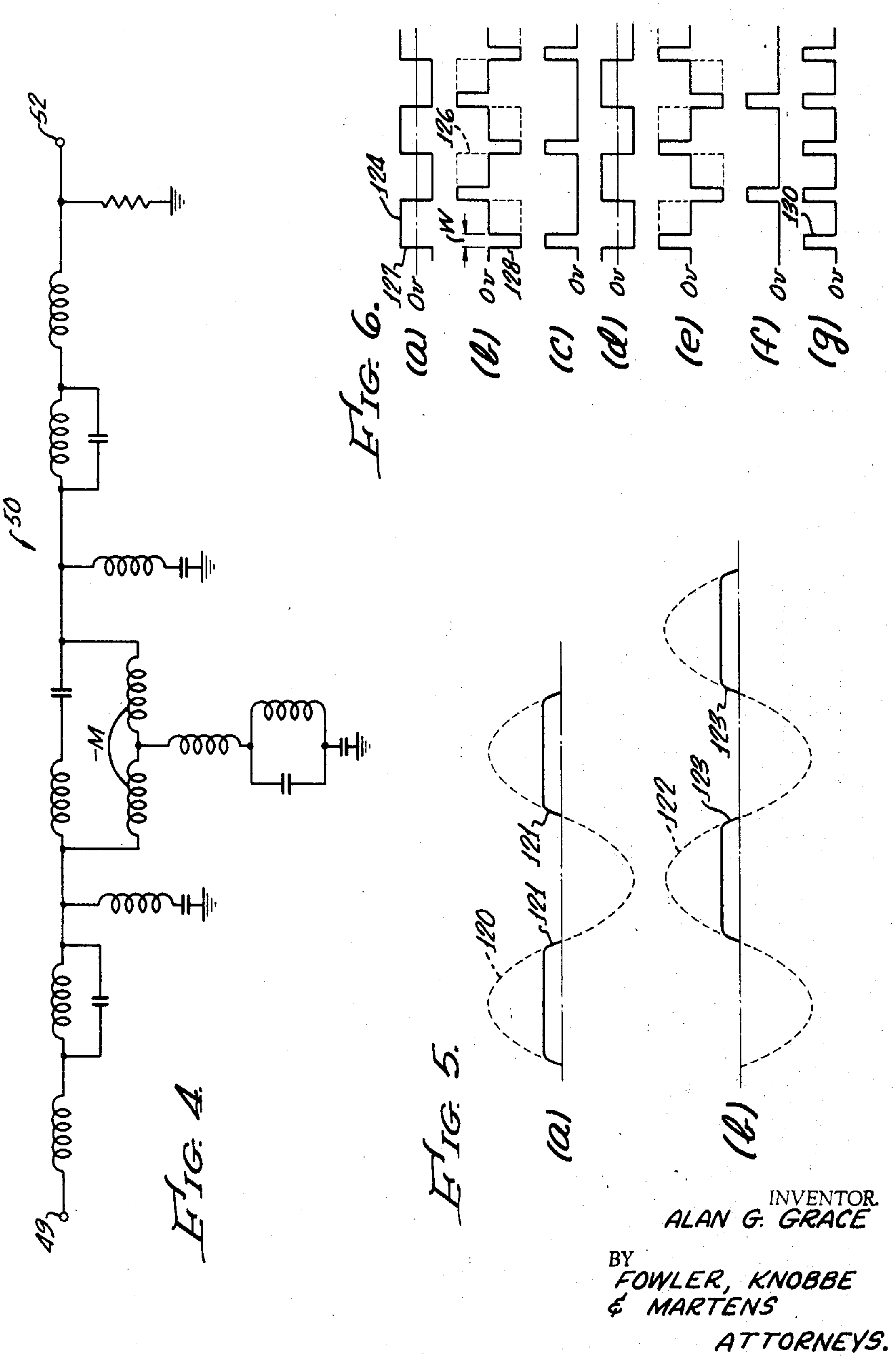
FIG. 4 is a schematic diagram of a low pass filter suitable for use with the preferred embodiment of the present invention.
FIG. 5 is a waveform showing the operation of the limiting stage.

Referring now to FIG. 4, there is shown a schematic diagram of a low pass filter which may be used in combination with the present invention. The specific filter shown in FIG. 4 is known in the art as a BBC linear phase low pass filter. However, as previously stated, any filter which has a linear phase and a flat bandpass up to 4 mc., dropping down 3 db at 4.25 mc. and dropping to greater than 45 db at all frequencies above 5.6 mc. might be used. Such a filter allows the entire video bandwidth to be recovered in the demodulated output effectively removing all of the carrier frequency energy.

Referring again to FIG. 1, the emitter followers 28 and 30, and the differential amplifier 32 might be described as a means for conditioning the signals on lines 27 and 29 as inputs to the transformer 34 and the detector means 48. The emitter followers 28 and 30 provide a power gain stage for these signals while the differential amplifier 32 amplifies their magnitude. The differential amplifier 32 also provides a simple means of balancing the resulting output signals on lines 45 and 47. These functions might also be performed by connecting the outputs from emitter followers 28 and 30 directly to the primary winding 36 and eliminating the differential amplifier 32. In this case the emitter followers 28 and 30 would necessarily be required to be exactly matched so that their output signals would be balanced. Also, two additional amplifiers would be required. Each such amplifier would be connected between the emitter follower outputs and the respective input to the detector means 48. These amplifiers would be necesary in order to provide sufficient amplitude gain to turn on the transistors 138 and 140.

What is claimed is:

1. A system for demodulating an angle modulated video signal comprising:

symmetrical limiter means for producing a first and second square wave representing the instantaneous frequency of said modulated signal, said square waves being 180° out of phase with each other, a differential amplifier responsive to said first and second square waves for generating a first pulse train having a frequency and phase corresponding to the frequency and phase of said first square wave and a second pulse train having a frequency and phase corresponding to the frequency and phase of said second square wave, a transformer having a primary and secondary winding, said primary winding having (i) a grounded center tap, (ii) a predetermined impedance connected in parallel with said primary winding, and (iii) said first and second pulse trains connected to its opposite terminals, a delay line having a predetermined characteristic impedance and a shorted termination, said delay line connected in series with a matching impedance, said series-connected delay line and matching impedance being connected in parallel with said secondary winding, said impedance connected in parallel with said primary winding having a value the same as the value of said series-connected delay line and matching impedance when reflected to said primary winding, said delay line being retsponsive to each of said pulses of said first and second pulse trains applied to said primary winding for producing a reflected wave at said primary winding terminals a predtermined time period after the occurrence of said pulses, detector means responsive to pulses on said primary winding for producing a third train of pulses, alternate pulses in said third pulse train being initiated in phase with said first pulse train pulses applied to said primary winding and terminated when said reflected pulses appear at said primary winding, the other pulses in said third pulse train being initiated in phase with said second pulse train pulses and terminated when said reflected pulses occur, said third pulse train having a frequency twice the instantaneous frequency of said modulated signal and each of said pulses having a predetermined duration substantially solely determined by the delay provided by said delay line and independent of the frequency and amplitude of said modulated signal, and a low pass filter coupled to said detector means and having a linear phase and flat attentuation characteristic over the video band and attentuating the frequencies above said video band to remove the carrier energy from said detector means output.

2. A system for reproducing a modulating signal from an angle modulated signal comprising:

means responsive to said modulated signal for producing a first and second pulse train, each said pulse train being 180° out of phase with the other and having a frequency the same as the instantaneous frequency of said modulated signal, a delay line means having a shorted termination for producing a reflected pulse a predetermined period of time following an incident pulse, coupling means responsive to said first and second pulse trains for pulsing said delay line means each time a pulse occurs on said pulse trains, detector means responsive to said first and second pulse trains and to said reflected pulses on said delay line means for generating a third pulse train having a frequency twice the instantaneous frequency of said modulated signal, each said pulse in said third pulse train having a fixed duration substantially determined by the delay time of said delay line means, and a low pass filter having said third pulse train as an input and having a linear phase and flat attenuation characteristic over the frequency band of said modulating signal and attenuating the frequencies above said frequency band to remove the carrier energy from said input.

3. The system of claim 2 wherein said first means comprises:

limiter means having said modulated signal as an input for producing first and second square waves each 180° out of phase with the other and each having a frequency representing the instantaneous frequency of said modulated signal, said square waves being independent of any amplitude variations in said modulated signal.

4. The system of claim 2 wherein said coupling means comprises:

a transformer having a primary winding with a grounded center tap, said first and second pulse trains being connected to opposite sides of said primary winding, said transformer also having a secondary winding coupled to said delay line.

5. The system of claim 4 wherein said detector means comprises:

first and second transistor current switches having commonly coupled collector electrodes and base electrodes coupled to opposite sides of said primary winding, said first transistor switch becoming conductive when a pulse in said first pulse train occurs and non-conductive when the consequent reflected pulse from said delay line occurs, said second transistor becoming conductive when a pulse in said second pulse train occurs and non-conductive when the consequent reflected pulse from said delay line occurs, said alternating conductive states of said first and second transistors generating a third pulse train at said common collector junction, said pulse train having a frequency twice the instantaneous frequency of said modulated signal and a duty cycle twice the delay time of said delay line.

6. In a system for reproducing a modulating signal from an angle modulated signal the combination comprising:

first means responsive to said modulated signal for producing first and second pulse trains 180° out of phase with each other and each having a frequency representing the instantaneous frequency of said modulated signal, second means responsive to said first and second pulse trains and including a single delay line, said pulses in said first and second pulse trains being coupled to said delay line, said delay line producing a delayed pulse a predetermined period of time following said incident pulses, and third means responsive to said first and said second pulse trains and to said delayed pulses on said delay line for generating a third pulse train having a frequency twice the instantaneous frequency of said modulated signal and a duty cycle twice the delay time provided by said delay line.

7. The system of claim 6 further including a low pass filter responsive to said third pulse train and having a linear phase and flat attenuation characteristic over the bandwidth of said modulating signal for reproducing said modulating signal.

8. The system of claim 6 wherein said first means comprises:

limiter means having said modulated signal as an input for producing first and second square waves each 180° out of phase with the other and each having a frequency representing the instantaneous frequency of said modulated signal, said square waves being independent of any amplitude variations in said modulated signal, and a differential amplifier responsive to said square waves for generating a first pulse train in phase with said first square wave and a second pulse train in phase with said second square wave, both said pulse trains having a frequency determined by said square waves.

9. The system of claim 6 wherein said second means comprises:

a transformer having a primary winding with a grounded center tap, said first and second pulse trains being connected to opposite sides of said primary winding, said transformer also having a secondary winding connected to said delay line.

10. The system of claim 9 wherein said third means includes first and second transistor current switches having commonly coupled collector electrodes and base electrodes coupled to opposite sides of said primary winding, said first transistor switch becoming conductive when a pulse in said first pulse train occurs and non-conductive when the consequent reflected pulse from said delay line occurs, said second transistor becoming conductive when a pulse in said second pulse train occurs and non-conductive when the consequent reflected pulse from said delay line occurs, said alternating conductive states of said transistors generating a third pulse train at said common collector junction, said pulse train having a frequency twice the instantaneous frequency of said modulated signal and a duty cycle twice the delay time of said delay line.

References Cited

UNITED STATES PATENTS

| | | | |
|---|---|---|---|
| 2,576,833 | 11/1951 | Goodall | 329—134 X |
| 2,912,573 | 11/1959 | Mitchell | 329—134 X |
| 3,193,771 | 7/1965 | Boatwright | 329—134 |
| 3,462,694 | 8/1969 | Avins | 329—110 |

ALFRED L. BRODY, Primary Examiner

U.S. Cl. X.R.

178—546; 307—233; 325—347; 329—103, 131, 145